(12) United States Patent
Mimouni

(10) Patent No.: US 7,869,332 B2
(45) Date of Patent: Jan. 11, 2011

(54) SOLID IMMERSION LENS WITH INCREASED FOCUSING CAPACITY

(75) Inventor: Salim Mimouni, Grenoble (FR)

(73) Assignee: Commissariat l'Energie Atomique, Paris (FR)

( * ) Notice: Subject to any disclaimer, the term of this patent is extended or adjusted under 35 U.S.C. 154(b) by 305 days.

(21) Appl. No.: 12/295,795

(22) PCT Filed: Apr. 2, 2007

(86) PCT No.: PCT/EP2007/053168
§ 371 (c)(1),
(2), (4) Date: Oct. 2, 2008

(87) PCT Pub. No.: WO2007/113281
PCT Pub. Date: Oct. 11, 2007

(65) Prior Publication Data
US 2009/0225442 A1 Sep. 10, 2009

(30) Foreign Application Priority Data
Apr. 4, 2006 (FR) .................................. 06 51193

(51) Int. Cl.
*G11B 7/00* (2006.01)
(52) U.S. Cl. ................... 369/112.23; 359/718; 359/719
(58) Field of Classification Search ............ 369/112.23; 359/718, 719
See application file for complete search history.

(56) References Cited

U.S. PATENT DOCUMENTS 5,125,750 A   6/1992   Corle et al.
6,633,439 B1  10/2003  Xu et al.
7,106,524 B2 * 9/2006  Song ........................... 359/719
2004/0001261 A1 * 1/2004 Hineno ....................... 359/719
2004/0203257 A1 10/2004 Yoshida et al.

FOREIGN PATENT DOCUMENTS

WO     00/23840 A1   4/2000
WO     02/41309 A1   5/2002

OTHER PUBLICATIONS

European Search Report.

* cited by examiner

*Primary Examiner*—Wayne R Young
*Assistant Examiner*—Latanya Bibbins
(74) *Attorney, Agent, or Firm*—Pearne & Gordon LLP

(57) ABSTRACT

There is provided a solid immersion lens in a material of refractive index n1, having an effective dioptre (26) separating from a medium of refractive index n2, an optical axis, a virtual object focal point for a convergent optical beam entering the lens via the effective dioptre, this virtual object focal point being conjugate with a real image focal point. The dioptre (26) is defined by the equation $\sqrt{x^2+y^2} - n\sqrt{(x-a)^2+y^2} = L$, x, y are the coordinates of a point (I) of the dioptre (26) in a system (A, x, y) whose origin is the virtual object focal point (A) and whose abscissa axis is the optical axis (Ax), a is the, nonzero, algebraic distance between the virtual object focal point (A) and its conjugate (A'),
L is the, nonzero, optical path, separating the virtual object focal point (A) from its conjugate (A'),
n is the ratio n1/n2 of the refractive indexes. The dioptre (26) is smooth and the conjugate (A') lies downstream of the effective dioptre (26) for the optical beam.

Particular application to reading, writing, reproduction of optical data.

10 Claims, 8 Drawing Sheets

SOLID IMMERSION LENS WITH INCREASED FOCUSING CAPACITY

TECHNICAL AREA

The present invention concerns a solid immersion lens (SIL) with increased focusing capacity. Said lens is of particular interest in the area of data writing and/or reading and/or reproduction on an optical recording medium intended for data storage. Other applications for this lens are possible, such as microscopy or lithography. Said SIL lenses are placed downstream of the objective lens of the apparatus to read and/or write and/or reproduce optical data, of the microscope or of the lithography equipment.

STATE OF THE PRIOR ART

Conventional lenses are defined by manufacturers by three parameters, of which two are the radii of curvature of their input and output dioptres, the third being the index of their constituent material. These parameters define the paraxial characteristics of a lens, such as its focal length. For finite distance image object conjugation, these conventional lenses operate with good focusing capacity for low-angle incident rays. As soon as the angle of the incident rays increases, they prove to be imperfect, since the wide-angle rays do not all focus at the same point as low-angle rays. To overcome this, point corrections are added to their surface, called aspherisations.

For solid immersion lenses, large numerical apertures are theoretically utilized, and the lenses used must be as perfect as possible irrespective of the angle of the incident ray. It is recalled that the expression «solid immersion »means that image focal point, at which focusing takes place, lies either inside the lens or at the output interface or even downstream of the lens in a field vicinity close to the output interface i.e. within a radius equal to the working wavelength divided by $2\pi$. Also, in said lenses, only one of the dioptres is actually used, the one located on the side of the objective lens which is intended to cooperate with said immersion lens (SIL). In the remainder hereof, this dioptre will be termed an effective dioptre. With said configuration it is possible to obtain conjugation that is as perfect as possible between a virtual object focal point and the real image focal point, independently of any defects induced by off-centring or misalignment. This solid immersion lenses, by definition, are imaging devices that are as perfect as possible. On the other hand, in particular in the above-cited applications, it is sought to improve their focusing capacity. As an example, the area concerning the reading and/or writing of data on an optical recording medium will be used to explain the desired improvements for said solid immersion lenses.

Recently there has been an increasing demand for increased storage capacity of optical discs, which has raised the problem of increasing data density on the optical recording medium, since an increase in the size of the optical recording medium cannot be envisaged. One direct response to this problem is to reduce the size of the light spot made by the laser beam on the optical recording medium. It is known that a read and/or write head with only one objective lens having an aberration-free numerical aperture NA achieves focusing of the laser beam, of wavelength $\lambda$, that is limited by diffraction. The size d of the spot is dependent only on the wavelength and numerical aperture NA of the lens. The approximate relationship connecting these magnitudes is:

$$d \approx 1.22\lambda/NA \quad (1)$$

In said formula, a reduction in wavelength $\lambda$ and/or an increase in numerical aperture NA, allows the size d of the spot to be reduced, and hence the recording density on the optical recording medium to be increased.

It is also known that the adding of a solid immersion lens to the read and/or write head increases numerical aperture as follows:

$$NA = n1 \cdot \sin(\alpha_m) \quad (2)$$

in which n1 is the refractive index of the constituent material of the solid immersion lens, $\alpha_m$ is the angle between the optical axis of the lens and the marginal radius. These two parameters allow characterization of the focusing power of the solid immersion lens.

Reference is made to FIGS. 1A, 1B which illustrate two configurations of conventional solid immersion lenses.

The lens in FIG. 1A is described in U.S. Pat. No. 5,125,750.

In these FIGS. 1A, 1B, an optical head 10 is shown which, in this example, is a read and/or write head and it is positioned close to an optical recording medium 3. The optical head 10, in cascade, comprises an objective lens 1 (schematised by a lens) and a solid immersion lens 2. The solid immersion lens 2 is inserted between the objective lens 1 and the optical recording medium 3. An optical beam 4 is shown emerging from the read and/or write head 10, it has passed through the objective lens 1 then the solid immersion lens 2 becoming focused and forming a spot 5 on the optical recording medium 3. An air space 8 is arranged between the solid immersion lens 2 and the optical recording medium 3. The read and/or write head 10 is therefore able float above the optical recording medium 3 without coming into contact with it when it moves.

In FIG. 1A, the effective dioptre 6 of the solid immersion lens 2 lies opposite the optical recording medium 3, on the side of the objective lens 1. It is hemispherical. The other dioptre 7 which lies on the side of the optical recording medium 3 is planar. In FIG. 1A, the numerical aperture of the read and/or write head 10 is n1 times greater than that of the objective lens 1 alone, owing to the presence of the hemispherical solid immersion lens 2, n1 representing the refractive index of the material of the solid immersion lens 2. The angle of the rays of the optical beam 4 is not altered by refraction in the solid immersion lens 4 in this so-called hemispherical configuration. Conjugation occurs between the centre of sphere with itself. The spot size is reduced by a factor n1 relative to the size it would have in the absence of the hemispherical solid immersion lens.

In FIG. 1B, the solid immersion lens performs better in terms of focusing capacity. The effective dioptre 6 of the solid immersion lens 2 facing the objective lens 1 of the read and/or write head 10 is now a truncated sphere whose thickness is greater than the radius of the sphere. This solid immersion lens is called a super-spherical lens. The angle of the rays of the optical beam 4 is modified when passing through the solid immersion lens. Additional convergence occurs compared with that generated by the objective lens 1. Conjugation is strictly stigmatic between the Young-Weierstrass points. This pair of points is unique when the refractive index n1 of the lens and that of the surrounding medium n2 are fixed as well as the radius of the sphere. The lens can be in air and n2=1. The numerical aperture of the read and/or write head 10 is $n1^2$ times greater than that of the objective lens 1 alone owing to the presence of the super-spherical solid immersion lens 2. The size of the spot is reduced by a factor $n1^2$ relative to the size it would have in the absence of the super-spherical solid immersion lens.

By using said solid immersion lenses, called spherical dioptre stigmatic lenses, it is possible to produce read and/or write heads 10 having a numerical aperture of more than 1. The thickness of the air space 8 between the solid immersion lens 2 and the optical recording medium 3 must be kept as low as possible to maintain a spot 5 that is as small as possible. The section of the optical beam 4 with an aperture of more than 1 i.e. located between the solid immersion lens 2 and the optical recording medium 3, effectively takes active part in the formation of the diffraction-limited spot 5. However, the reflectivity of this section of the optical beam increases when the air gap 8 increases. U.S. Pat. No. 5,125,750 teaches a method for continuous monitoring of the gap between the solid immersion lens and the optical recording medium at less than 100 nanometres and even, in best case, less than 50 nanometres.

DESCRIPTION OF THE INVENTION

The object of the present invention is to propose a solid immersion lens which does not have the above limitations and difficulties i.e. having increased focusing capacity.

A further object of the invention is to propose a solid immersion lens with which it is possible to further reduce the size of the spot and more generally the maximum cross-section dimension of an optical beam emerging from this lens when it is utilized in an optical head downstream of an objective lens.

To achieve these purposes, the invention more precisely concerns a solid immersion lens made in a material of refractive index n1, having an effective separation dioptre with a medium of refractive index n2, an optical axis, a virtual object focal point for a convergent optical beam entering the SIL lens via the effective dioptre, this virtual object focal point being conjugate with a real image focal point. The effective dioptre is defined by the equation $\sqrt{x^2+y^2} - n\sqrt{(x-a)^2+y^2} = L$ in which:

x, y are the coordinates of a point of the effective dioptre in a Cartesian coordinate system whose origin is the virtual object focal point and whose abscissa axis is the optical axis, a is the algebraic distance between the virtual object focal point and its conjugate, this distance being nonzero, L is the optical path separating the virtual object focal point from its conjugate, this optical path being constant and nonzero, n is the ratio of the refractive index n1 to refractive index n2, the effective dioptre being smooth and the conjugate lying downstream of the effective dioptre for the optical beam.

It is recalled that in an optical system, the virtual object focal point corresponds to the point of convergence of the continuation, in their initial direction, of the rays of a convergent incident beam entering the optical system. The focal point is termed an object focal point since it is constructed from rays entering into the optical system, and a virtual focal point as it is the continuations of the rays which intersect at this point. The rays which are to exit the optical system do not follow this path. The real image focal point corresponds to the point of convergence of the rays leaving the optical system and which result from the incident convergent beam. This focal point is called an image focal point since it is the exiting rays which intersect at this point, and a real focal point since it is the rays themselves which intersect at this point.

The lens also comprises another dioptre opposite the effective dioptre, this other dioptre advantageously being planar.

It is preferable for the conjugate of the virtual object focal point to be located at the other dioptre.

In an application for a read and/or write and/or reproduction head of optical data in particular, it is preferable that the solid immersion lens comprises a bevelled edge which flares outwardly as it draws close to the effective dioptre, so as to avoid contact between the lens and an optical data write medium.

It is preferable that, when the effective dioptre is illuminated by an optical beam having a maximum cross-section dimension, the algebraic distance between the virtual object focal point and its conjugate should be substantially equal to the maximum cross-section dimension of the optical beam illuminating the effective dioptre.

The solid immersion lens has a maximum cross-section dimension, it is preferable that the algebraic distance between the virtual object focal point and its conjugate should be substantially equal to its maximum cross-section dimension.

The material of the solid immersion lens can be diamond or LaSF35 glass.

The present invention also concerns an optical head comprising an objective lens cooperating with a solid immersion lens such as defined, the effective dioptre of the solid immersion lens lying on the side of the objective lens.

The present invention also concerns optical apparatus comprising an optical head such as defined. This optical apparatus can be a read and/or write and/or reproduction head of optical data, a microscope, lithography equipment.

BRIEF DESCRIPTION OF THE DRAWINGS

The present invention will be better understood on reading the description of examples of embodiment given solely by way of illustration and in no way limiting, with reference to the appended drawings in which.

Identical, similar or equivalent parts of the different figures described below carry the same references to facilitate cross-referencing between the figures.

The different parts illustrated in the figures are not necessarily drawn to uniform scale, for better legibility of the figures.

DETAILED DESCRIPTION OF PARTICULAR EMBODIMENTS

Figure 1A:
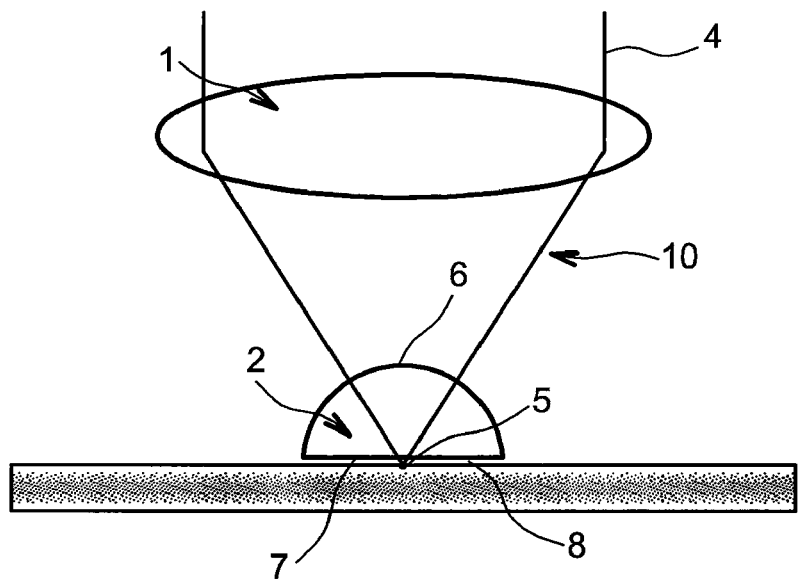
FIGS. 1A, 1B (already described) respectively depict an optical head comprising a hemispherical solid immersion lens and a super-spherical solid immersion lens respectively.
Figure 1B:
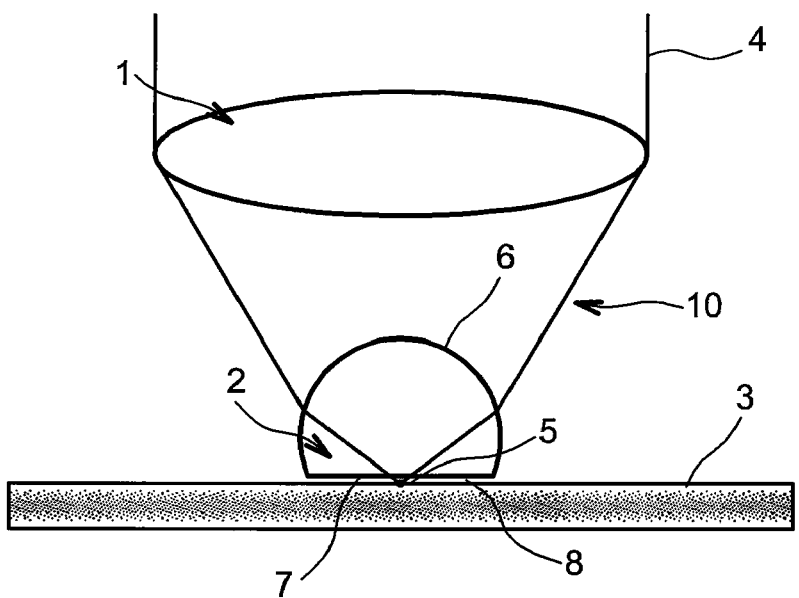
Figure 2:
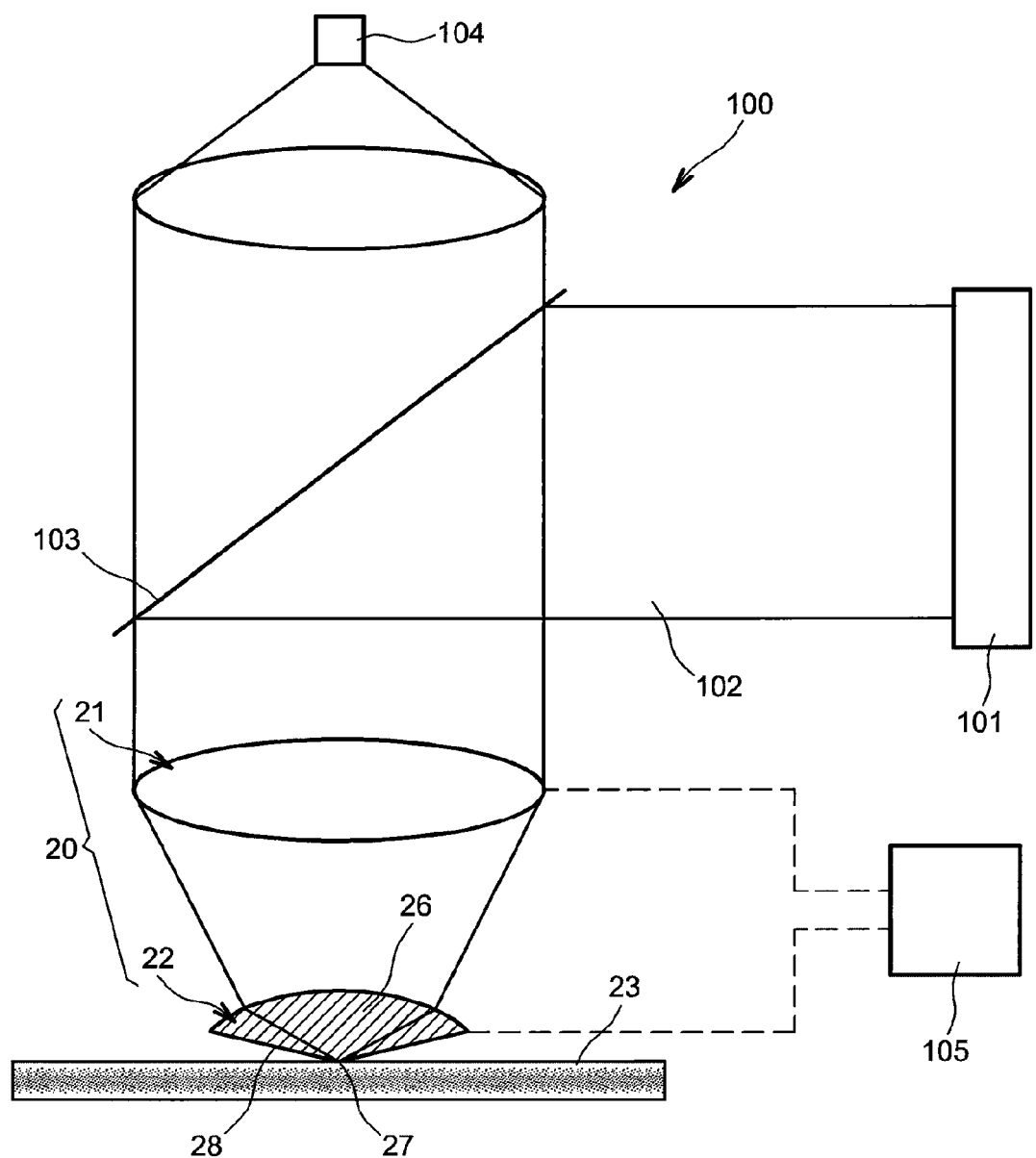
FIG. 2 illustrates optical apparatus according to the invention equipped with an optical head according to the invention, itself equipped with a solid immersion lens of the invention.

Reference is made to FIG. 2 which illustrates an example of a solid immersion lens according to the invention, which equips an optical head 20 of optical apparatus 100 according to the invention. In the described example, the optical head 20 is a read and/or write head and the optical apparatus 100 is read and/or write and/or reproduction apparatus of optical information on an optical recording medium 23. The apparatus could just as well have been a microscope or lithography instrument. In apparatus of microscope of lithography instrument type, the optical head would evidently be configured similarly, which is why said heads have not been explicitly shown so as not to increase the number of figures unnecessarily. The same applies to the optical apparatus. As in the preceding examples, the solid immersion lens 22 is inserted between the objective lens 21 of the optical head 20 and the optical recording medium 23.

The solid immersion lens 22 of the invention has two opposite dioptres, one referenced 27 located on the side of the optical recording medium 23, and the other so-called effective dioptre referenced 26 lying on the side of the objective lens 21 of the optical head 20. In an electronic microscope, the write medium would be replaced by an object to be observed, and in lithography equipment by an object to be patterned.

The optical apparatus 100 also comprises an optical source 101 (e.g. a laser) intended to transmit an optical beam 102 towards a beam splitter 103. The optical beam 102 is diverted by the beam splitter 103 and concentrated on the optical recording medium 23 after passing through the optical head 20. The optical beam 102 arriving on the optical recording medium 23 is reflected and collected by a receiver device 104 e.g. of photodiode type. The optical apparatus 100 also comprises servo means 105 to position the optical head 20 in relation to the optical recording medium 23. Well-known parts of this apparatus are not shown in detail for better clarity of the present description.

As previously, the dioptre 27 lying on the side of the optical recording medium 23 is substantially planar. The other dioptre 26 is now aspherical, it is the effective dioptre. The optical beam 102 is convergent and it enters the SIL lens via the effective dioptre 26. This solid immersion lens always performs strict stigmatism i.e. the optical path between a point object and a point image is independent of the path of the light rays passing through the lens. The solid immersion lens of the invention does not therefore use the same type of conjugations particular to spherical dioptres, it does not lead to the same spot size gain, either in numerical aperture or in field depth.

It is assumed that the solid immersion lens of the invention is made in a material having a refractive index n1 and that it is intended to be immersed in a medium with a refractive index n2 different to n1. In general n2 is air with a value of 1. The lens material may, for example, be diamond whose refractive index is 2.4619 for a wavelength of 405 nanometres, or it may be glass of LaSF35 type for example (Schott catalogue reference) whose refractive index is 2.02 for a wavelength of 405 nanometres. Hereunder, n will be used to designate the ratio n2/n1.

Figure 3:
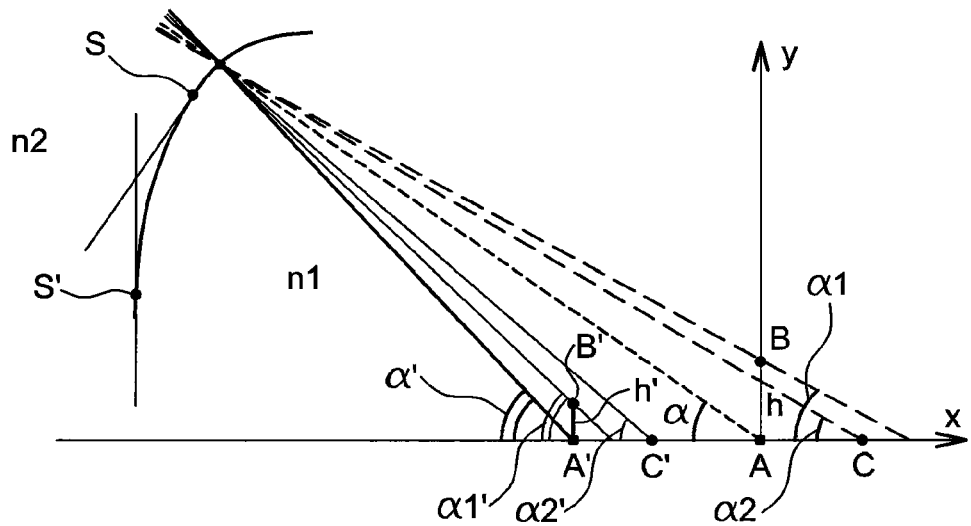
FIG. 3 illustrates a portion of the effective dioptre of a solid immersion lens according to the invention, and the real and virtual rays passing through it.

The shape of the effective dioptre 26 of the solid immersion lens is defined by the following equation:

$$\sqrt{x^2+y^2} - n\sqrt{(x-a)^2+y^2} = L \tag{3}$$

where x, y are coordinates of a point I of the effective dioptre in a Cartesian coordinate system (A, x, y), illustrated FIG. 3, having an origin A and abscissa axis Ax which is an optical axis of the lens, and an ordinate axis which is a meridian axis of the lens. The effective dioptre is a revolution surface about the optical axis Ax. The optical axis Ax is directed towards downstream of the effective dioptre for an optical beam passing through the lens from the effective dioptre. Origin A is conjugate with a point A' also positioned on the optical axis Ax, and the algebraic magnitude AA' is denoted a. This magnitude a may be seen as a shape factor. Point A is a point-object or virtual object focal point of the lens. Point A' can be located at the other dioptre of the lens, or it may be immersed or lie outside the lens. It corresponds to the real image focal point of the lens. Point A' may also be called a point image. The magnitude L represents the optical path between the origin A and its conjugate A'. The magnitude L is constant and nonzero. Magnitude a is also nonzero. In fact, points A and A' generally verify Fermat's principle expressed as:

$$\overline{IA} + n\overline{IA'} = L \tag{4}$$

which guarantees strict stigmatism.

The curve described by point I (x, y) is not a circle since it cannot assume the form $(x-u)^2 + (y-u)^2 = R^2$. It is not a conical point either, it cannot assume the form $ex^2 + fy^2 + gxy + hx + iy + j = 0$ since, if equation (3) is squared, a quantity remains below the square root.

To define the effective dioptre of the lens according to the invention, magnitude a may be chosen to be substantially equal to the maximum cross-section dimension of the optical beam at the effective dioptre, or substantially equal to the maximum cross-section dimension of the lens. If the optical beam has a circular section, this maximum cross-section dimension is its diameter. If the solid immersion lens is circular, the maximum cross-section dimension is its diameter.

In relation to the desired numerical aperture, magnitude L is therefore obtained as will be seen below.

The focusing power of the lens has a direct influence on the size of the spot illuminating the optical recording medium 23. The size of the spot at the real image focal point of the solid immersion lens is given by equation (1) which, by combining equations (1) and (2) gives:

$$d' = 1.22 \lambda / n1 \sin(\alpha') \tag{5}$$

For the effective dioptre of the lens of the invention, whose equation is given by (3), we have:

$$\sin(\alpha) = \frac{y}{\sqrt{x^2+y^2}} \tag{6}$$

$$\sin(\alpha') = \frac{y}{\sqrt{(x-a)^2+y^2}}$$

We then obtain:

$$\left|\frac{\sin(\alpha')}{\sin(\alpha)}\right| = \left|\frac{n}{1-L/r}\right| \tag{7}$$

The ratio of numerical apertures NA'/NA, with and without a solid immersion lens, translates the focusing power, $$P = \frac{n^2}{|1 - L/r|} \quad (8)$$

r representing the distance separating point I(x,y) of the effective dioptre to origin A.

This magnitude P is greater than $n^2$ since 1/1−L/r can be less than one for certain values of L.

For a hemispherical solid immersion lens, the effective dioptre follows:

$$\sqrt{x^2 + y^2} = \left|\frac{L}{1-n}\right| \quad (9)$$

which means that, compared with equation (3) a=0 and L/r=n+1, P=n is effectively obtained. In this case, A merges with A'.

For a super-spherical solid immersion lens, the effective dioptre obeys:

$$\left(x - \frac{an^2}{n^2 - 1}\right)^2 + y^2 = \left(\frac{an}{n^2 - 1}\right)^2 \quad (10)$$

which means that, compared with equation (3) L=0, and $P=n^2$ is effectively obtained.

To come back to the lens of the invention with aspherical effective dioptre, the focusing power depends on magnitude r. This means that, according to incidence, a ray which strikes this aspherical dioptre will be refracted with a different gain in numerical aperture. There exists an infinite number of strictly stigmatic effective dioptres which meet equation (3) when magnitude a is fixed.

For the SIL lens of the invention to be technically feasible, two conditions also need to be met. The first is that the effective dioptre must be smooth, which means that the curve defining this effective dioptre is derivable once and its derivative is continuous. In other words, it has a single tangent at all points. The second condition is that point A' must be positioned downstream of the effective dioptre for an optical beam entering the lens via the effective dioptre and leaving via the other dioptre. By the expression «positioned downstream of the effective dioptre »is meant that the abscissa of conjugate point A' in the coordinate system (A, x, y) is algebraically greater than those of the points of the effective dioptre or is equal to the greatest abscissa of the effective dioptre points. Axis Ax of the abscissas has been oriented so that it is directed towards downstream of the effective dioptre for an optical beam entering the lens via the effective dioptre and leaving via the other dioptre. Point A' is not positioned strictly upstream of all the points of the dioptre.

It is advantageous to reduce the surface of the solid immersion lens 22 closest to the optical recording medium 23, to avoid risks of contact between the solid immersion lens and the optical recording medium. This can be achieved by bevelling the edge 28 of the solid immersion lens 22 according to the invention, between the two dioptres 26, 27. The bevelled edge 28 flares outwardly as it draws closer to the effective dioptre 26. The optical beam 102 does not pass through the bevelled edge 28, which means that its properties are not deteriorated.

As in conventional solid immersion lenses, the real image focal point A' preferably lies at the other dioptre 27, therefore the size of the spot on the recording medium 23 is as small as possible.

We will now compare the evolute of the aspherical effective dioptre of the SIL lens according to the invention with the evolute of hemispherical and super-spherical effective dioptres of conventional lenses.

The notion of radius of curvature is briefly recalled with reference to FIG. 3. The mean curvature of a curve I(x, y) between two points S and S' is quantified by the ratio between the angle formed by the tangents to the curve at S et S' and by the length of the arc SS'. The mean radius of curvature is the inverse of mean curvature by definition. If S and S' draw together indefinitely, the limit of mean curvature corresponds to what can be called curvature at a single point S. The radius of curvature at this single point S is always the inverse of curvature. The centre of curvature lies at the free end of the radius of curvature. Intuitively, the radius of curvature (not shown FIG. 3) of a curve I(x, y) at a point S is the radius of the circle which best follows the curve I(x, y) in the vicinity of point S. Therefore, for a straight line, the radius of curvature is infinite and curvature is zero. For a circle, curvature is constant and its value is the inverse of the radius.

Figure 4A:
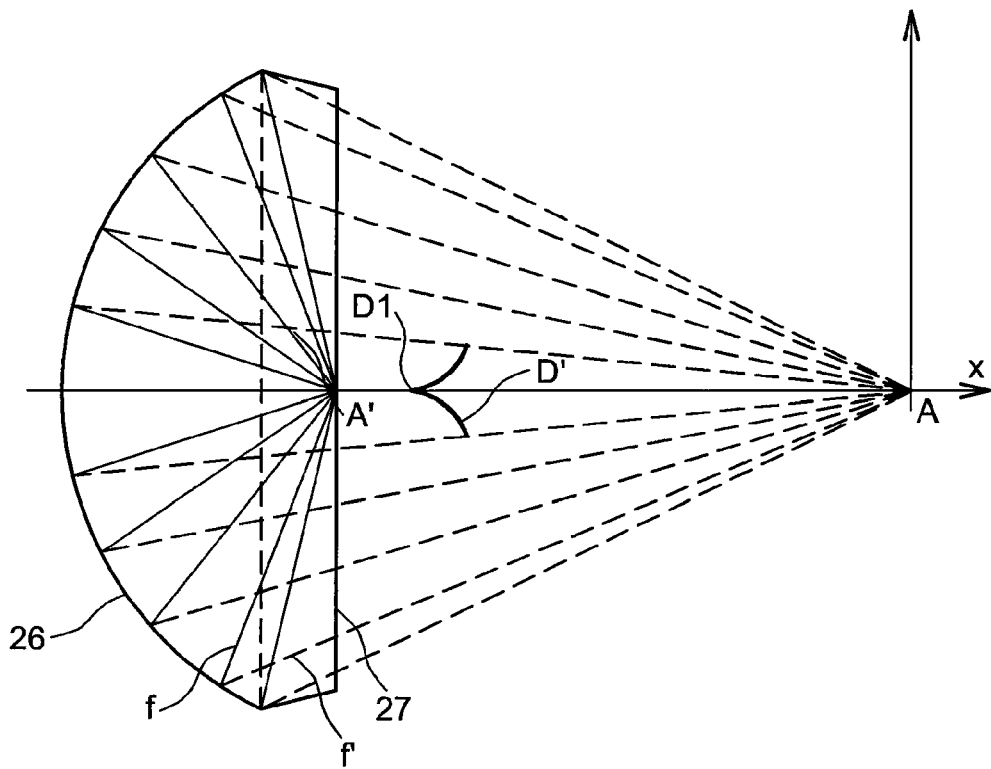
FIG. 4A illustrates a solid immersion lens according to the invention and the evolute of its effective dioptre, FIGS. 4B, 4C showing the effective dioptres and their evolutes of conventional solid immersion lenses, hemispherical and super-spherical respectively.
Figure 4B:
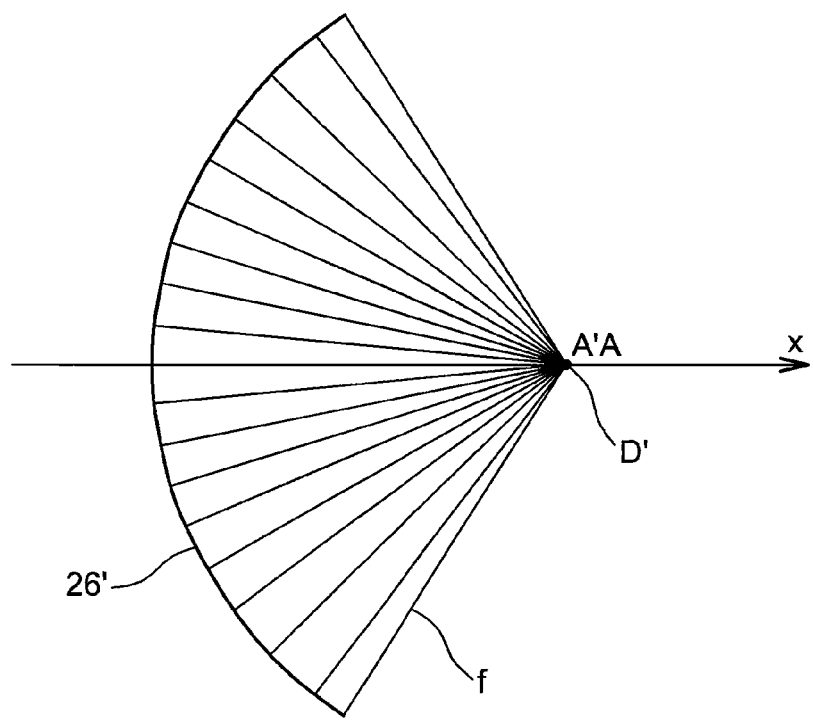
Figure 4C:
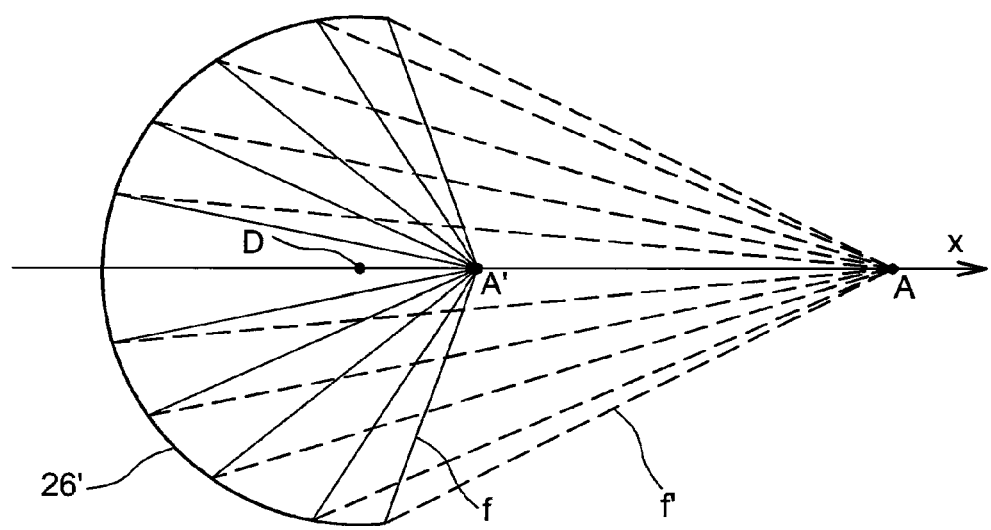

The evolute of the effective dioptre is the surface obtained by the revolution about the optical axis Ax of the evolute of the meridian curve at this effective dioptre. It is recalled that the evolute of a curve is the locus of all its centres of curvature when the radius of curvature follows the curve. FIGS. 4A, 4B, 4C respectively illustrate the evolute of the effective dioptre of a solid immersion lens according to the invention, the evolute of the effective dioptre of a conventional hemispherical solid immersion lens, and the evolute of the effective dioptre of a conventional super-spherical solid immersion lens. In these figures, the effective dioptre 26, 26' is illustrated together with optical rays f focusing at the immersed real image focal point A' (point image). Virtual optical rays f∝ are also illustrated FIGS. 4A and 4C, they concentrate at the virtual object focal point A (point object), since in these cases focal points A and A' are separate.

This evolute reveals the nature of the effective dioptre. If this evolute is a dot (denoted D) as in FIG. 4B, this means that the effective dioptre is spherical, this dot D merging with point A itself merging with point A'. In FIG. 4C, this dot D is separate from points A and A'. It has a smaller abscissa than focal points A and A'. In FIG. 4A, the evolute D' is a substantially V-shaped curve whose dot D1 represents the centre of a circle which best follows the contour of curve I(x,y) in the vicinity of the optical axis Ax. This dot D1 forms the paraxial centre of curvature and a first-order approximation of the effective dioptre 26. It could be shown that the shape of the evolute of the effective dioptre 26 is similar to that of a semi-cubic parabola expanding either side of the optical axis Ax. This semi-cubic parabola is the general evolute of a conical, this confirms that the effective dioptre 26 has $2^{nd}$ order approximation by a conical, whose equation is easily obtained by producing an expansion limited to second order of the radical present in equation (3).

It has been seen that the effective dioptre of a lens according to the invention is strictly stigmatic for the pair of points A and A'. Aberration is zero for perfect focusing at the real image focal point A'. On the other hand, it is of interest to analyse under which conditions a point B in the vicinity of A in a plane orthogonal to the optical axis Ax passing through A, conjugates perfectly at a point B' in the vicinity of A', located in a plane orthogonal to the optical axis Ax passing through A'. This perfect conjugation characterizes a planetic lenses. Reference can be made to FIG. 3.

If there is conjugation between B and B', the following can be written:

$$dL = -\overrightarrow{AB} \cdot \vec{u} + \overrightarrow{A'B'} \cdot \vec{u}' \tag{11}$$

in which dL is constant.

We then fall under the condition well known to Abbé which links the two points B and B'. Let us write $\overline{AB}=h$ and $\overline{A'B'}=h'$. The equation can be written:

$$h' = \frac{\sin(\alpha 1)}{n\sin(\alpha 1')}h \tag{12}$$

as well as equation:

$$h' = \frac{h(1 - L/r(\alpha 1))}{n^2} \tag{13}$$

It is ascertained that point B' varies with angle $\alpha 1$.

The solid immersion lens of the invention is not aplanetic whereas the super-spherical solid immersion lens is aplanetic. The hemispherical immersion lens was not aplanetic either.

Similarly, by using the same optical path differentiation method, it is possible to analyse the conjugation conservation condition between a point C located on the optical axis Ax in the vicinity of A and a point C' belonging to the optical axis Ax and close to A'. This leads to the following equation (14) known as Herschel's condition. Let us write $\overline{AC}=k$ et $\overline{A'C'}=k'$. This gives:

$$k' = \frac{\sin^2(\alpha 2/2)}{n\sin^2(\alpha 2'/2)}k \tag{14}$$

Therefore point C' conjugate of C in all configurations, depends on angle $\alpha$. The solid immersion lens of the invention does not maintain stigmatism along the optical axis Ax. Point C lies on the optical axis Ax.

Figure 5A:
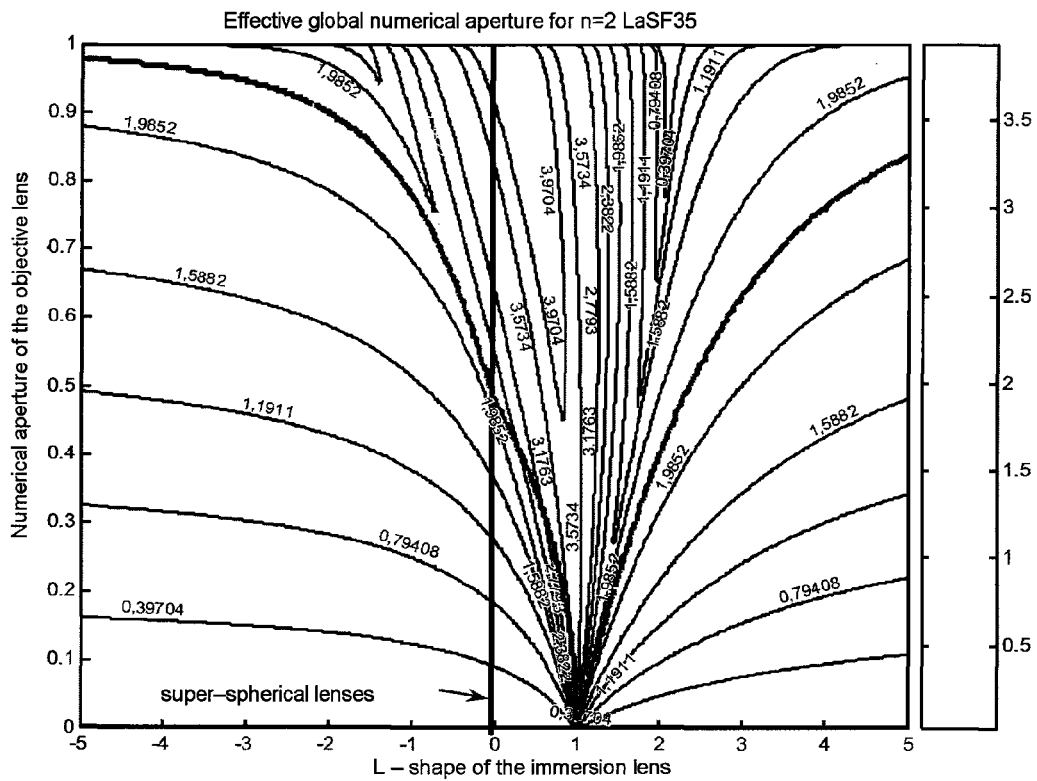
FIGS. 5A, 5B are charts used to determine the effective dioptre of solid immersion lenses according to the invention.
Figure 5B:
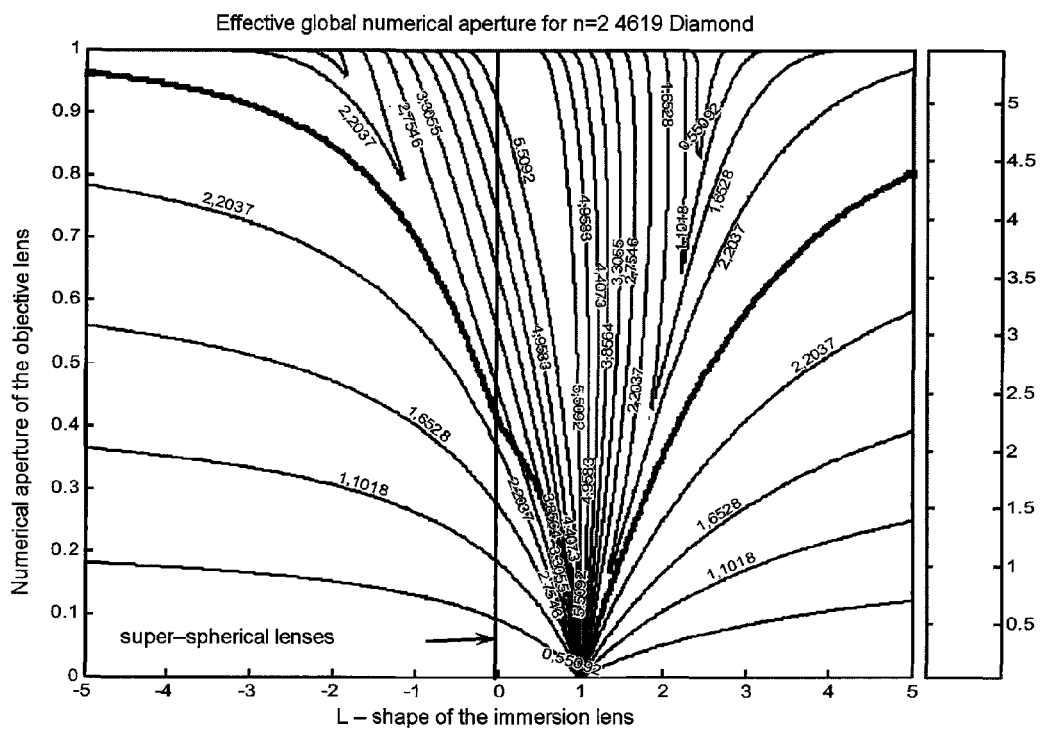

The two following FIGS. 5A, 5B are optimisation charts to produce solid immersion lenses according to the invention in LaSF35 glass (refractive index n1=2.09) and diamond (refractive index n1=2.46) respectively, at a wavelength of 405 nm. Along the abscissa, magnitude L is found of equation (3), and along the ordinate the numerical aperture of the optical beam illuminating the effective dioptre of the lens. The magnitude chosen is a=1. Arbitrary units are used. The different curves shown as thin lines below curves in bold lines represent the possible global numerical apertures for an aspherical lens according to the invention cooperating with an objective lens. Above the bold line curves, the numerical apertures are shown which cannot be obtained since the lens of the invention is not feasible as explained above. The straight line passing through the zero abscissa is excluded since it characterizes a super-spherical solid immersion lens (with L=0). Once magnitude a has been chosen, and the charts have been plotted by computer in relation to materials, wavelength and numerical aperture of the objective lens, all that is required is to choose the global numerical aperture suitable for a given application and to deduce magnitude L of the lens. The equation followed by the effective dioptre is then obtained. Said lens can then be fabricated by moulding or machining since its effective dioptre is perfectly determined.

With reference now to FIGS. 6A to 6G, exemplary solid immersions lenses will be described according to the invention making a comparison with conventional super-spherical and hemispherical solid immersion lenses.

An optical head will be described used in air, comprising an objective lens whose numerical aperture NA is 0.45 and which cooperates with a conventional super-spherical solid immersion lens in LaSF35 glass whose refractive index n1 is 2.09. The focusing power of the SIL lens is $n1^2$ i.e. 4.3681. The effective dioptre of this lens is illustrated FIG. 6A. The numerical aperture NA' of the optical head is $n1^2 NA$ i.e. 1.97. As previously, the virtual object focal point is called A, the real image focal point of the lens is called A' and the distance AA' is chosen to be −1. The SIL lens is placed in a Cartesian coordinate system (A, x, y) whose origin is A, the abscissa axis is the optical axis of the lens and the ordinate axis is the meridian axis of the lens. Real image rays are shown as solid lines, they pass through point A'. Virtual object rays are shown as dotted lines, they pass through point A.

Figure 6A:
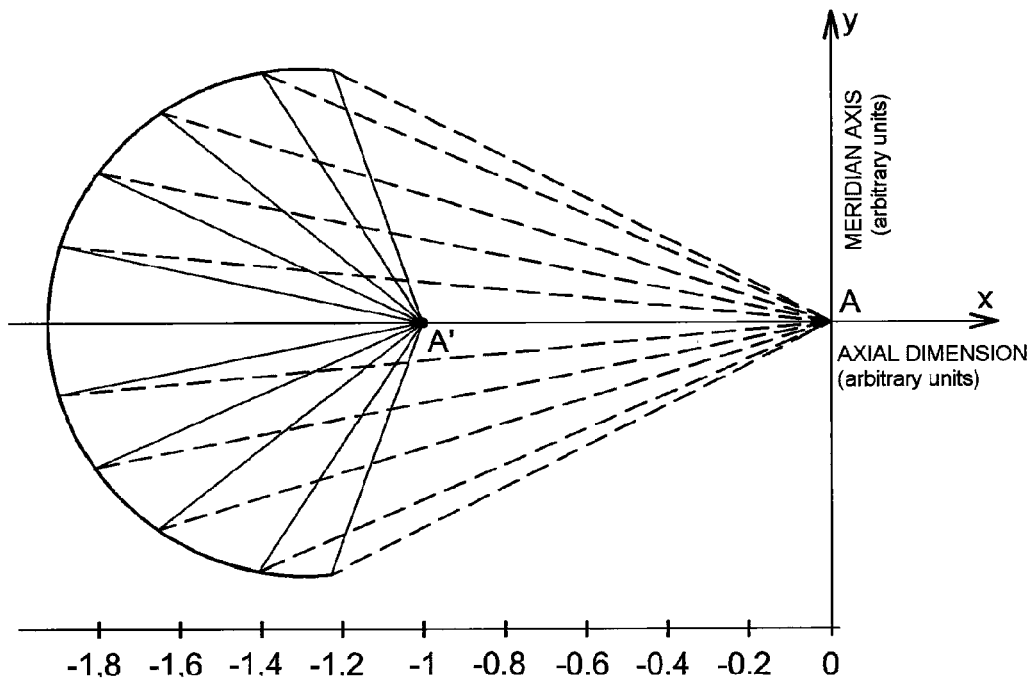
FIG. 6A gives an example of a super-spherical solid immersion lens.
Figure 6B:
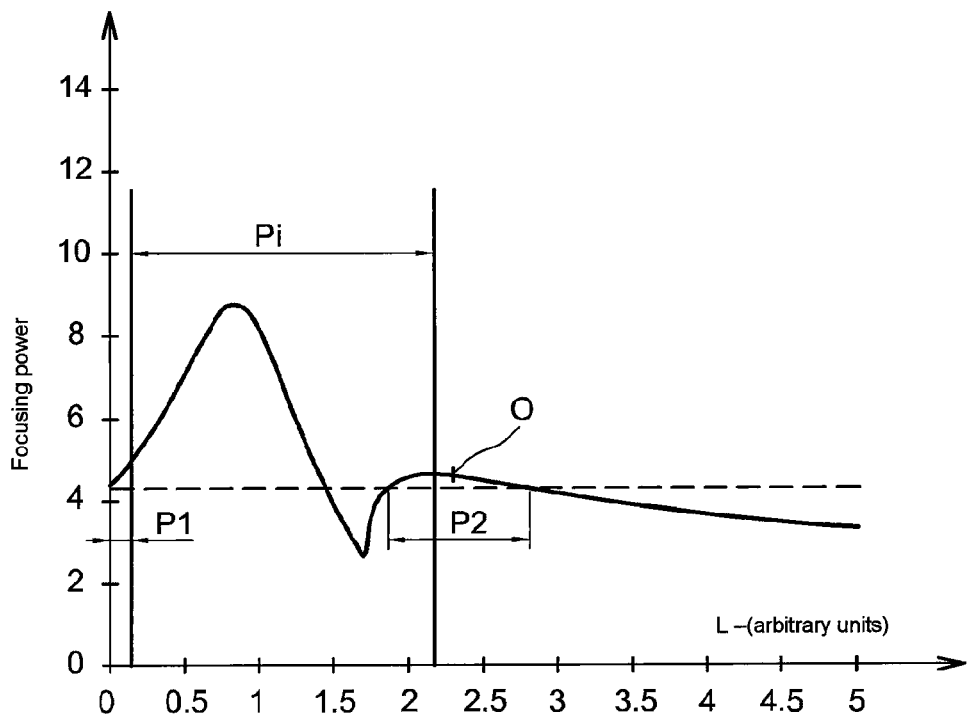
FIG. 6B is an optimisation curve to determine the effective dioptre of a solid immersion lens of the invention derived from the solid immersion lens in FIG. 6A.

FIG. 6B illustrates an optimisation curve which, from the super-spherical solid immersion lens illustrated FIG. 6A, is used to obtain an aspherical immersion lens of the invention. The value of parameter a remains −1. Parameter L of the optical path, expressed in arbitrary magnitudes, is caused to change and the variations in focusing power are observed of the SIL lens having an effective dioptre obtained with these values L and a. The range denoted Pi illustrates an area in which it is not technically possible to obtain said effective dioptre. Two ranges P1, P2 are also shown which correspond to those of solid immersion lenses according to the invention. The straight dotted line represents the level of focusing power of the super-spherical solid immersion lens of FIG. 6A. It is to be noted that the plotted optimisation curve is specific to a given objective lens of the optical head and to the refractive index of the material of the solid immersion lens.

Figure 6C:
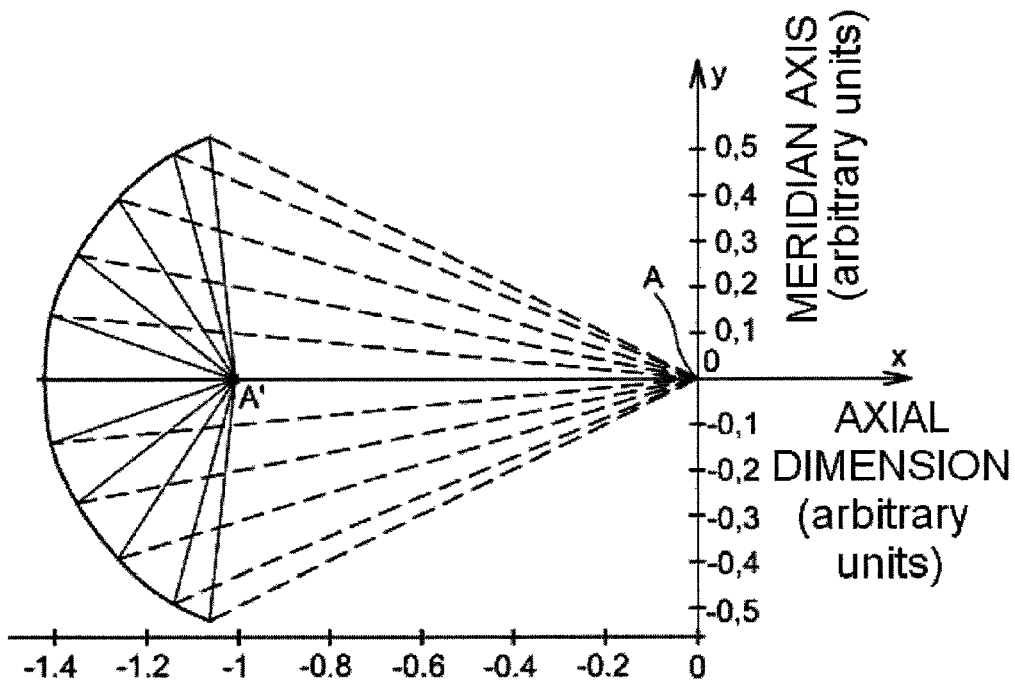
FIG. 6C illustrates an example of effective dioptre of a solid immersion lens obtained from the curve in FIG. 6B.

FIG. 6C illustrates an exemplary effective dioptre of a solid immersion lens according to the invention, obtained from the optimisation curve in 6B when parameter L assumes an optimised value of 2.3. In FIG. 6B, this value is identified by point 0. The numerical aperture NA' of the optical head (objective lens+SIL lens) then equals 2.08, whereas its value was 1.97 with the super-spherical solid immersion lens in FIG. 6A.

We will now turn to an optical head comprising an objective lens whose numerical aperture NA is 0.7 and which cooperates with a conventional solid immersion lens in LaSF35 glass whose refractive index n1 is 2.09. The focusing power of the lens is n1 i.e. 2.09. The effective dioptre of this lens is illustrated FIG. 6D. The numerical aperture NA' of the optical head is n1NA i.e. 1.463. The distance AA' is now zero (a=0), point A merging with point A'. The solid immersion lens is placed in a Cartesian coordinate system (A, x, y). Real image rays are shown, they converge towards point A'. They merge with the virtual object rays.

Figure 6D:
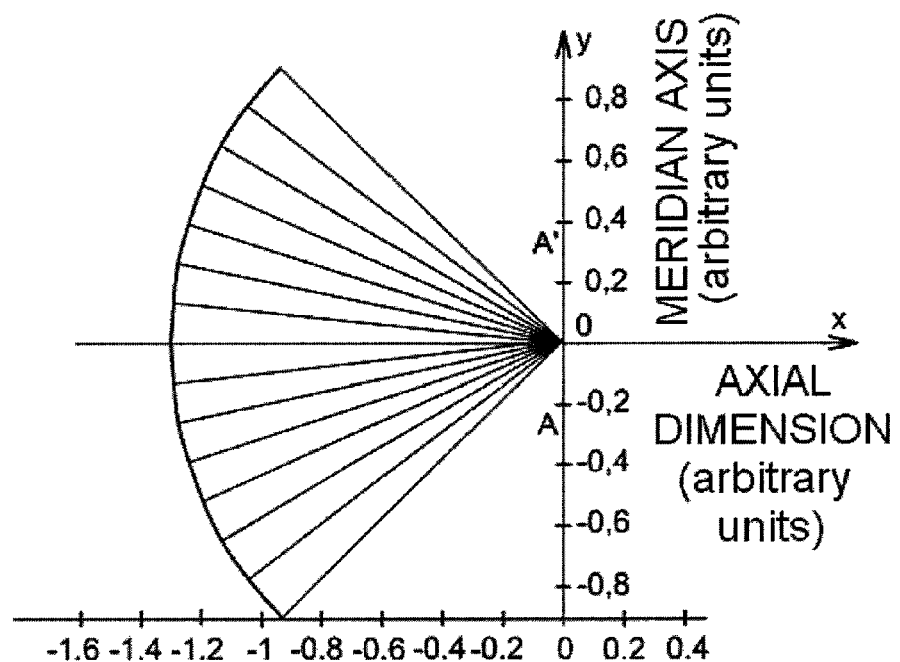
FIG. 6D gives an example of a hemispherical solid immersion lens.
Figure 6F:
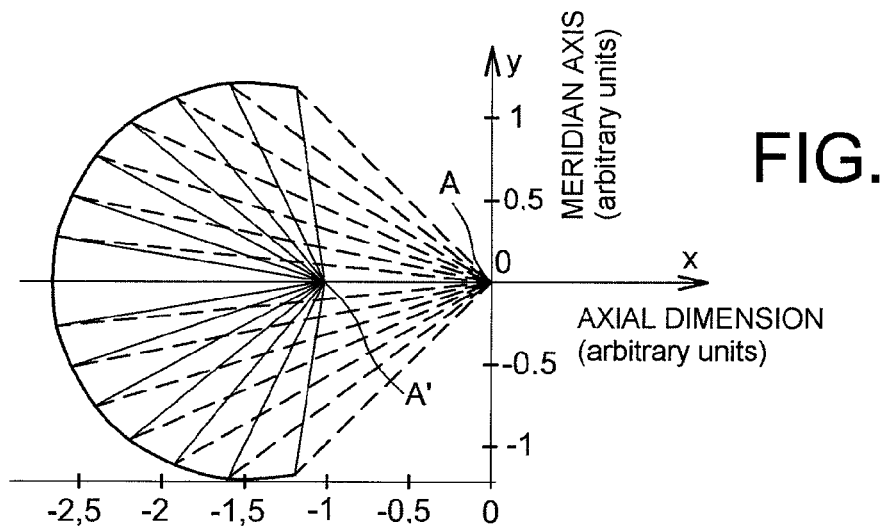
FIG. 6E is an optimisation curve used to determine the effective dioptre of a solid immersion lens of the invention derived from the solid immersion lens in FIG. 6D, FIGS. 6F and 6G illustrate the effective dioptre of two solid immersion lenses obtained from the curve in FIG. 6D.
Figure 6G:
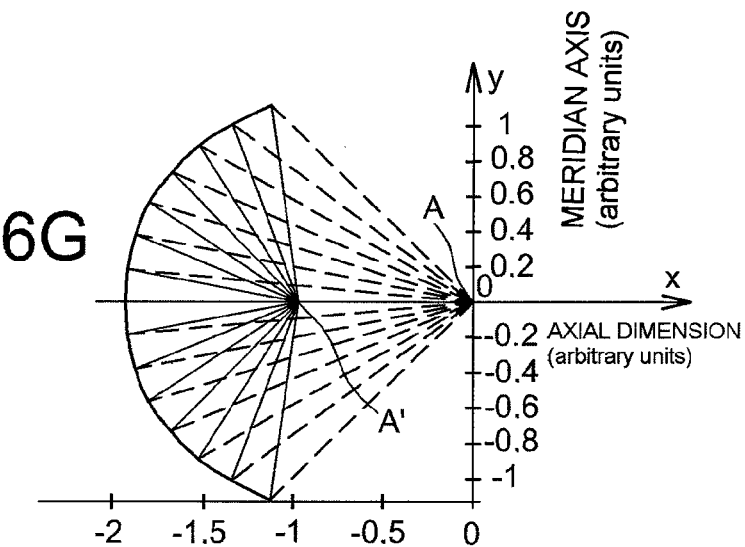
Figure 6E:
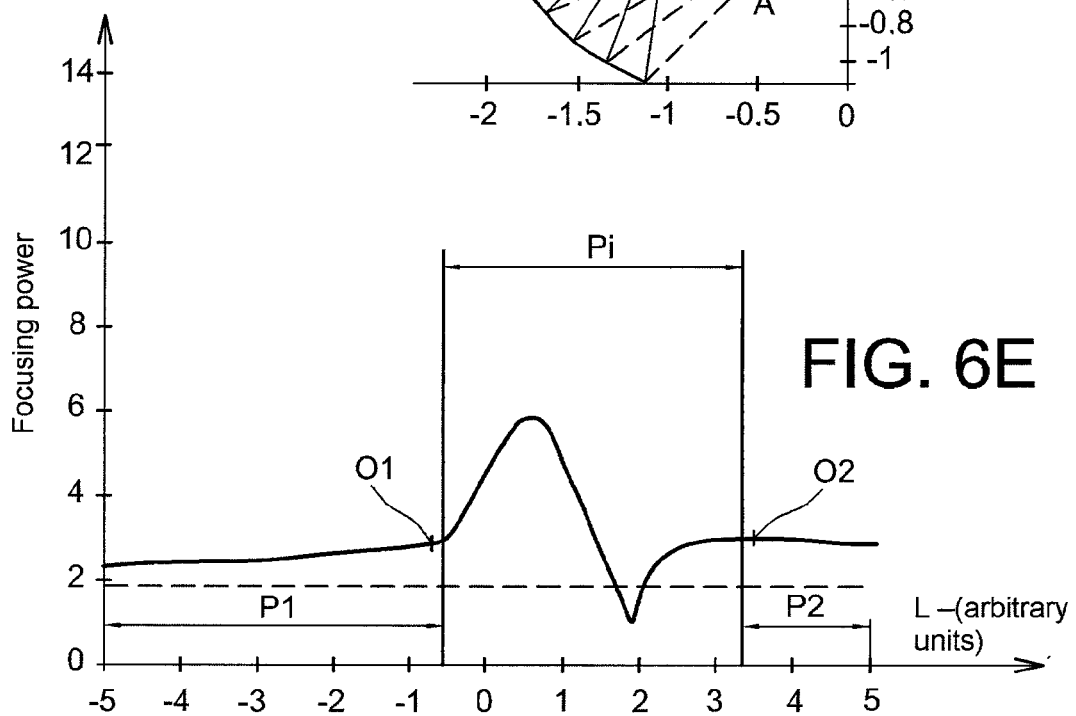

FIG. 6E illustrates an optimisation curve which, from the hemispherical solid immersion lens illustrated FIG. 6D, is used to obtain an aspherical immersion lens according to the invention. The optical pathway parameter L, expressed in arbitrary magnitudes, is caused to change and variations in the focusing power of the lens are observed which has an effective dioptre obtained with these values L and a=0. The range denoted Pi illustrates the area in which it is not technically possible to produce said effective dioptre. Two ranges P1, P2 are also shown which correspond to those of solid immersion lenses according to the invention. The dotted straight line represents the focusing power of the hemispherical solid immersion lens in FIG. 6D.

FIG. 6F illustrates a first example of effective dioptre of a solid immersion lens according to the invention, obtained from the optimisation curve in FIG. 6E when parameter L assumes an optimised value of −0.8. In FIG. 6E, this value is identified by a point O1. The numerical aperture NA' of the optical head is then 2.06, whereas its value was 1.463 with the hemispherical lens in FIG. 6D.

FIG. 6G illustrates a second example of effective dioptre of a lens according to the invention, obtained from the optimisation curve in FIG. 6E when parameter L assumes an optimised value of 3.5. In FIG. 6E, this value is identified by a point 02. The numerical aperture NA' of the optical head is 2.07 whereas its value was 1.463 with the hemispherical lens in FIG. 6D.

In FIGS. 6C, 6F, 6G, it can be seen that the effective dioptre is defined by a smooth curve and that the abscissa of point A' (−1) is greater than the abscissa of each of the points of the effective dioptre. The maximum abscissa of the points of the effective dioptre was identified. The two additional conditions needed to obtain the effective dioptre of the lens according to the invention are met.

Although several embodiments of the solid immersion lens according to the invention have been shown and described in detail, it will be appreciated that various changes and modifications may be made thereto without departing from the scope of the invention.

The invention claimed is:

1. Solid immersion lens through which a convergent optical beam is intended to pass, made in a material with a refractive index n1, having an effective dioptre (26) separating from a medium of refractive index n2, the convergent optical beam entering the lens via the effective dioptre (26), an optical axis (Ax), a virtual object focal point (A) for the convergent optical beam, this virtual object focal point being conjugate with a real image focal point (A'), characterized in that the effective dioptre (26) is defined by the equation $\sqrt{x^2+y^2} - n\sqrt{(x-a)^2+y^2} = L$ in which:

x, y are the coordinates of a point (I) of the effective dioptre (26) in a Cartesian coordinate system (A, x, y) whose origin is the virtual object focal point (A) and whose abscissa axis is the optical axis (Ax), a is the algebraic distance between the virtual object focal point (A) and its conjugate (A'), this distance being nonzero, L is the optical path separating the virtual object focal point (A) from its conjugate (A'), this optical path being constant and nonzero, n is the ratio of refractive index n1 to refractive index n2, and in that the effective dioptre (26) is smooth and conjugate (A') lies downstream of the effective dioptre (26) for the optical beam.

2. Solid immersion lens according to claim 1, characterized in that it comprises another dioptre (27) opposite the effective dioptre (26), this other dioptre being substantially planar.

3. Optical immersion lens according to claim 2, characterized in that the conjugate (A') of the virtual object focal point (A) lies at the other dioptre (27).

4. Solid immersion lens according to claim 1, characterized in that it comprises a bevelled edge (28) which flares outwardly as it draws close to the effective dioptre (26).

5. Solid immersion lens according to claim 1, characterized in that, when the effective dioptre is illuminated by an optical beam having a maximum cross-section dimension, the algebraic distance (a) between the virtual object focal point (A) and its conjugate (A') is substantially equal to the maximum cross-section dimension of the optical beam illuminating the effective dioptre (26).

6. Solid immersion lens according to claim 1, having a maximum cross-section dimension, characterized in that the algebraic distance between the virtual object focal point (A) and its conjugate (A') is substantially equal to its maximum cross-section dimension.

7. Solid immersion lens according to claim 1, characterized in that its constituent material is diamond or LaSF35 glass.

8. Optical head (20), characterized in that it comprises an objective lens (21) which cooperates with an optical immersion lens (22) according to claim 1, the effective dioptre (26) of the solid immersion lens lying on the side of the objective lens (21).

9. Optical apparatus (100) characterized in that it comprises an optical head (20) according to claim 8.

10. Optical apparatus (100) according to claim 9, characterized in that it is read and/or write and/or reproduction apparatus for optical data, a microscope, lithography equipment.

* * * * *

UNITED STATES PATENT AND TRADEMARK OFFICE
CERTIFICATE OF CORRECTION

PATENT NO. : 7,869,332 B2
APPLICATION NO. : 12/295795
DATED : January 11, 2011
INVENTOR(S) : Salim Mimouni et al.

Page 1 of 1

It is certified that error appears in the above-identified patent and that said Letters Patent is hereby corrected as shown below:

In Column 3, line 35, please delete " $\sqrt{x^{2+y2}}$ " and insert -- $\sqrt{x^2+y^2}$ -- therefor.

In Column 6, line 26, please delete "(x<u)$^2$" and insert -- (x–u)$^2$ + -- therefor.

In Column 8, line 37, please delete "f∝" and insert -- f'-- therefor.

In Column 9, line 1, please delete "a planetic" and insert --aplanetic-- therefor.

Signed and Sealed this
Fifth Day of April, 2011

David J. Kappos
*Director of the United States Patent and Trademark Office*